United States Patent
Gwon et al.

(10) Patent No.: US 10,434,595 B2
(45) Date of Patent: Oct. 8, 2019

(54) METHOD FOR WELDING ELECTRODE TAB OF SECONDARY BATTERY AND ELECTRODE ASSEMBLY MANUFACTURED USING SAME

(71) Applicant: LG CHEM, LTD., Seoul (KR)

(72) Inventors: Yeong Tae Gwon, Daejeon (KR); Jae Kyung Oh, Daejeon (KR); Min Su Kim, Daejeon (KR); Jung Kyu Woo, Daejeon (KR); Hyang Mok Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 288 days.

(21) Appl. No.: 14/903,916

(22) PCT Filed: Sep. 1, 2014

(86) PCT No.: PCT/KR2014/008125
§ 371 (c)(1),
(2) Date: Jan. 8, 2016

(87) PCT Pub. No.: WO2015/030541
PCT Pub. Date: Mar. 5, 2015

(65) Prior Publication Data
US 2016/0175979 A1 Jun. 23, 2016

(30) Foreign Application Priority Data

Sep. 2, 2013 (KR) .................. 10-2013-0104779
May 15, 2014 (KR) .................. 10-2014-0058325

(51) Int. Cl.
*H01M 10/00* (2006.01)
*B23K 11/11* (2006.01)
(Continued)

(52) U.S. Cl.
CPC ............ *B23K 11/11* (2013.01); *H01M 2/26* (2013.01); *H01M 10/04* (2013.01); *H01M 2/30* (2013.01); *H01M 2220/30* (2013.01)

(58) Field of Classification Search
CPC ......... B23K 11/11; H01M 2/26; H01M 10/04; H01M 2220/30; H01M 2/30
See application file for complete search history.

(56) References Cited

U.S. PATENT DOCUMENTS

| 4,321,455 A * | 3/1982 | Hill ........................ B23K 9/08 |
| | | 219/121.56 |
| 2002/0146620 A1* | 10/2002 | Connell ............... H01M 2/0277 |
| | | 429/161 |

(Continued)

FOREIGN PATENT DOCUMENTS

| CN | 1466236 A | 1/2004 |
| CN | 102265445 A | 11/2011 |

(Continued)

OTHER PUBLICATIONS

Extended European Search Report for Appl. No. 14839968.6 dated Jul. 1, 2016.

(Continued)

*Primary Examiner* — Nicholas P D'Aniello
(74) *Attorney, Agent, or Firm* — Mintz Levin Cohn Ferris Glovsky and Popeo, P.C.; Kongsik Kim; Jhongwoo Jay Peck (57) ABSTRACT

Disclosed herein are a method for welding electrode taps of a secondary battery which improves insulation defects generated during welding between the electrode taps and lead parts and an electrode assembly manufactured thereby. The method for welding electrode taps includes performing main welding to connect electrode taps protruded from electrode plates provided in a battery and lead parts electrically connecting the electrode taps to external terminals and (Continued)

having a lead film on the surfaces thereof and, in main welding, a welding part is formed in a partial section of an overlapping region between the electrode tap and the lead part, and a non-welding section is formed between the welding part and the lead film.

7 Claims, 6 Drawing Sheets (51) Int. Cl.
*H01M 10/04* (2006.01)
*H01M 2/26* (2006.01)
*H01M 2/30* (2006.01)

(56) References Cited

U.S. PATENT DOCUMENTS

| | | | |
|---|---|---|---|
| 2003/0113618 A1* | 6/2003 | Xing | ............ H01M 2/021 429/129 |
| 2003/0232243 A1 | 12/2003 | Hong | |
| 2006/0286454 A1 | 12/2006 | Hong | |
| 2008/0028598 A1 | 2/2008 | Hong | |
| 2008/0083113 A1 | 4/2008 | Hong | |
| 2011/0039131 A1 | 2/2011 | Moon | |
| 2011/0070477 A1 | 3/2011 | Fujiwara et al. | |
| 2011/0135997 A1 | 6/2011 | Watanabe et al. | |
| 2012/0321946 A1 | 12/2012 | Kim | |
| 2014/0332074 A1 | 11/2014 | Wang et al. | |

FOREIGN PATENT DOCUMENTS

| | | |
|---|---|---|
| CN | 102306735 A | 1/2012 |
| JP | 11-233133 A | 8/1999 |
| JP | 2001-266820 A | 9/2001 |
| JP | 2002-75324 A | 3/2002 |
| JP | 2002-198031 A | 7/2002 |
| JP | 2008-59948 A | 3/2008 |
| JP | 2010-16043 A | 1/2010 |
| JP | 2011-65900 A | 3/2011 |
| KR | 10-2006-0027249 A | 3/2006 |
| KR | 10-2011-0049864 A | 5/2011 |
| KR | 10-2013-0012812 A | 2/2013 |
| TW | M457596 U1 | 7/2013 |
| TW | M461152 U1 | 9/2013 |
| WO | WO 2013/105361 A1 | 7/2013 |

OTHER PUBLICATIONS

International Search Report, issued in PCT/KR2014/008125, dated Jan. 8, 2015.

* cited by examiner

METHOD FOR WELDING ELECTRODE TAB OF SECONDARY BATTERY AND ELECTRODE ASSEMBLY MANUFACTURED USING SAME

BACKGROUND OF THE INVENTION

Field of the Invention

The present invention relates to a method for welding electrode taps of a secondary battery which improves insulation defects generated during welding between the electrode taps and lead parts of the secondary battery and an electrode assembly manufactured thereby.

Description of the Related Art

As demand for mobile devices rapidly increases, demand for secondary batteries applied to mobile devices increases and thus technical research on secondary batteries is vigorously carried out.

In general, secondary batteries are rechargeable and may be small-sized and large-sized, and a lithium (Li) battery is representatively used as a secondary battery.

However, although secondary batteries are rechargeable and used as an eco-friendly energy source, as described above, they have a problem regarding stability thereof.

That is, various chemical reactions in a secondary battery are caused by temperature rise due to abnormal energy conversion in the secondary battery. Thereby, lowering of stability of the secondary battery, i.e., ignition and explosion, may occur.

In more detail, if the secondary battery is exposed to high temperature or a high intensity of current flows in the secondary battery within a short time due to external short circuit, the secondary battery is heated by IR heating and a dangerous state, such as heating, ignition, explosion, etc., may be caused. Therefore, durability of secondary batteries needs to be improved.

Figure 1:
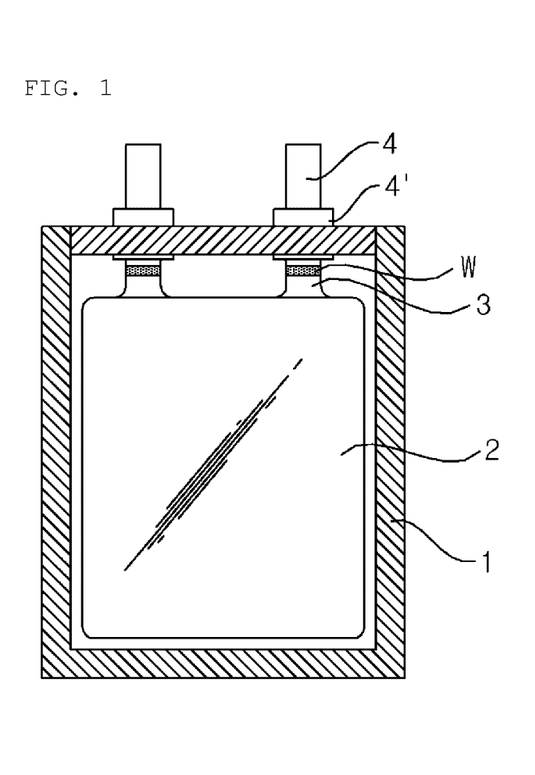
FIG. 1 is a view illustrating the connection structure between an electrode tap and a lead part in a general secondary battery.

A conventional secondary battery includes an electrode assembly 2 in which anode plates, separator films, and cathode plates are alternately stacked, installed within a battery case 1, as exemplarily shown in FIG. 1. Among the electrode assembly 2, the anode plate is formed of aluminum or an aluminum alloy as a base material, and the cathode plate is formed of copper as a base material.

Further, electrode taps 3 protruding one side of the electrode assembly 2 for connection to lead parts 4 are provided at the respective plates. The lead parts 4 serve to connect the respective plates to external terminals, the lead parts 4 and the electrode taps 3 are mainly connected by welding, and welding parts W are formed through welding.

However, during a resistance welding process, a plurality of nuggets is generated between the electrode taps 3 and the lead parts 4 due to fusion of the welding parts W by welding rods. During such a process, foreign substances, such as fine metal particles, are dispersed and move to the lead parts 4 and thus destroy a lead film 4' during a subsequent process, i.e., sealing of the battery case 1, thereby causing insulation defects.

SUMMARY OF THE INVENTION

Therefore, the present invention has been made in view of the above problems, and it is an object of the present invention to provide a welding method in which dispersion of metal particles caused by welding is prevented and thus an insulation defect rate is greatly reduced, and an electrode assembly manufactured thereby.

In accordance with an aspect of the present invention, the above and other objects can be accomplished by the provision of a method for welding electrode taps including performing main welding to connect electrode taps protruded from electrode plates provided in a battery and lead parts electrically connecting the electrode taps to external terminals and having a lead film on the surfaces thereof, wherein, in main welding, a welding part is formed in a partial section of an overlapping region between the electrode tap and the lead part, and a non-welding section is formed between the welding part and the lead film.

The method may further include performing tack welding to perform welding for interconnection between a plurality of stacked electrode taps, prior to main welding.

The method may further include cutting the ends of the electrode taps on which tack welding is not performed, after tack welding.

Main welding may be performed using a welding guide member to measure the position of the non-welding section.

The electrode plate may be a cathode plate.

The electrode plate may be an anode plate.

In accordance with another aspect of the present invention, there is provided an electrode assembly including electrode taps protruded from electrode plates provided in a battery, lead parts electrically connecting the electrode taps to external terminals, having a lead film on the surfaces thereof, and overlapping with the electrode taps in a designated section, welding parts, each of which is formed in a partial section of an overlapping region between the electrode tap and the lead part, and non-welding sections formed between the welding parts and the lead films.

The electrode plate may be a cathode plate.

The electrode plate may be an anode plate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments in accordance with the present invention will be described in detail with reference to the annexed drawings.

Figure 2:
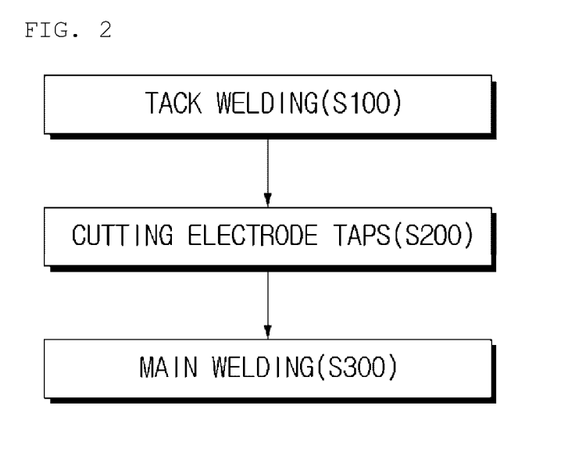
FIG. 2 is a flowchart illustrating a method for welding electrode taps in which an insulation defect rate of a secondary battery in accordance with one embodiment of the present invention is reduced.

A method for welding electrode taps in which an insulation defect rate of a secondary battery in accordance with one embodiment of the present invention is reduced includes performing tack welding (Operation S100), cutting taps (Operation S200), and performing main welding (Operation S300).

FIGS. 3 to 7 are views schematically illustrating the structures of a battery cell 10 and an electrode tap 100 which are changed according to performance of the welding method in accordance with the present invention. Herein, for conceptual description, only one electrode tap 100 is illustrated.

Figure 3:
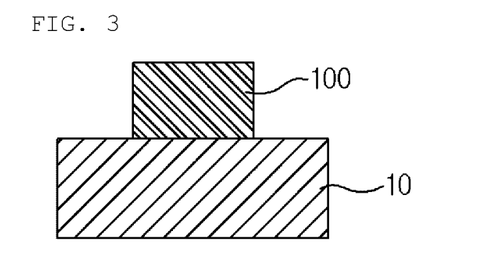
FIG. 3 is a view schematically illustrating the structures of an electrode tap and a battery cell before a welding operation is performed.

Prior to welding, the electrode tap 100 in which a plurality of electrode plates is stacked protrudes upward from the upper surface of the battery cell 10, as exemplarily shown in FIG. 3. If tack welding (Operation S100) is performed in such a state, a tack welding part 101 is formed on the electrode tap 100, as exemplarily shown in FIG. 4.

Figure 4:
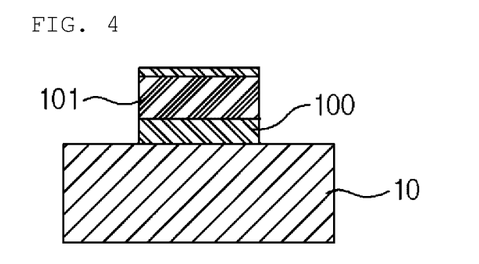
FIG. 4 is a view illustrating tack welding performed on the electrode tap shown in FIG. 3.

In more detail, tack welding (Operation 100) serves to interconnect a plurality of stacked electrode taps 100 and is carried out through resistance welding. Resistance welding is a method in which heat is generated by internal electrical resistance to current flowing in a conductor, heat is acquired by contact resistance, generated from metal or generated on a contact surface between different kinds of metal by supplying a high intensity of current under the condition that pressure is applied through welding rods 400, and inherent resistance of the metal, and thus junction between the different kinds of metal is carried out by the applied pressure while the different kinds of metal are heated or melted.

That is, when current flows under the condition that pressure is applied to the upper and lower surfaces of the stacked electrode taps 100 through the welding rods 400, the electrode taps 100 are melted and connected by pressure and, during such a process, depressed nuggets N are formed on the tack welding part 101.

Tack welding (Operation S100) may be performed after a plurality of electrode taps 100 is collected in a bundle so that a subsequent operation, i.e., cutting of the taps (Operation S200), may be easily performed, and the number of times of welding in main welding (Operation S300) may be reduced through tack welding (Operation S100).

After tack welding (Operation S100), cutting of the taps (Operation S200) is performed.

Cutting of the taps (Operation S200) is an operation of cutting an end of the tap 100 which is not welded during tack welding (Operation S100). The boundary ends of both sides of the tack welding part 101 are cut so that a non-welded portion is not left at the cut end of the tack welding part 101 and thereby, a non-welded portion is effectively removed (With reference to FIG. 5). Therefore, the end of the tack welding part 101 on which cutting of the taps (Operation S200) has been performed forms a welded end.

After cutting of the taps (Operation S200), main welding (Operation S300) is performed.

Main welding (Operation S300) is an operation of electrically connecting the electrode tap 100 and a lead part 200.

The lead part 200 has a function of electrically connecting the electrode tap 100 to an external terminal, and a lead film 201 is attached to the lead part 200.

The lead film 201 acts as an adhesive member between the battery case (not shown) and the lead part 200 during sealing of the lead part 200 and serves to prevent damage to the battery case (not shown) due to the lead part 200.

Figure 5:
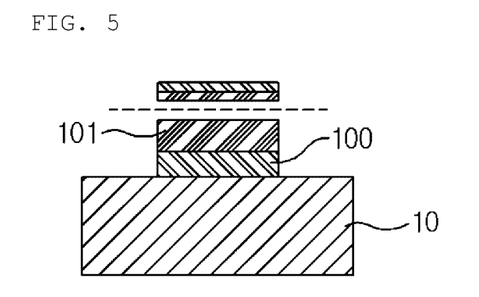
FIG. 5 is a view illustrating cutting of the end of the tack-welded part of the electrode tap shown in FIG. 4.
Figure 6:
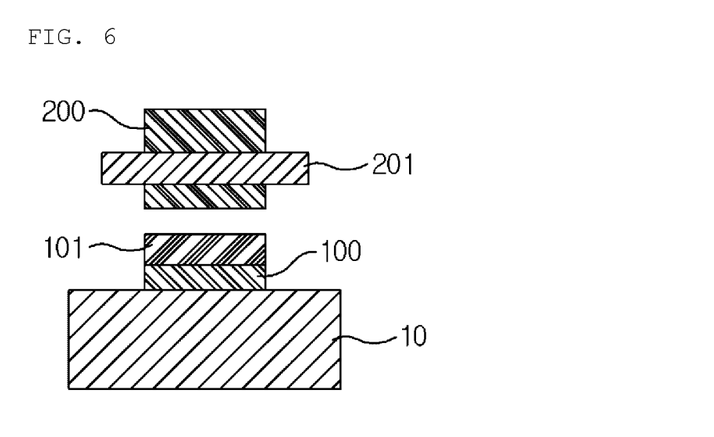
FIG. 6 is a view illustrating connection of the cut electrode tap shown in FIG. 5 and a lead part.
Figure 7:
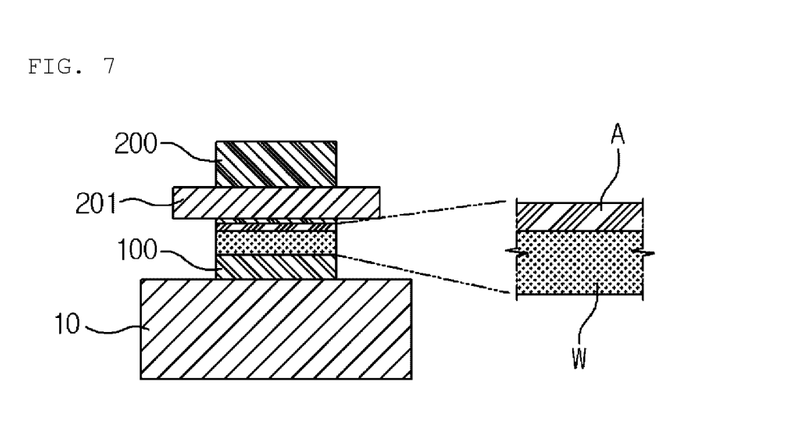
FIG. 7 is a view illustrating the connected electrode tap and lead part shown in FIG. 6.
Figure 8:
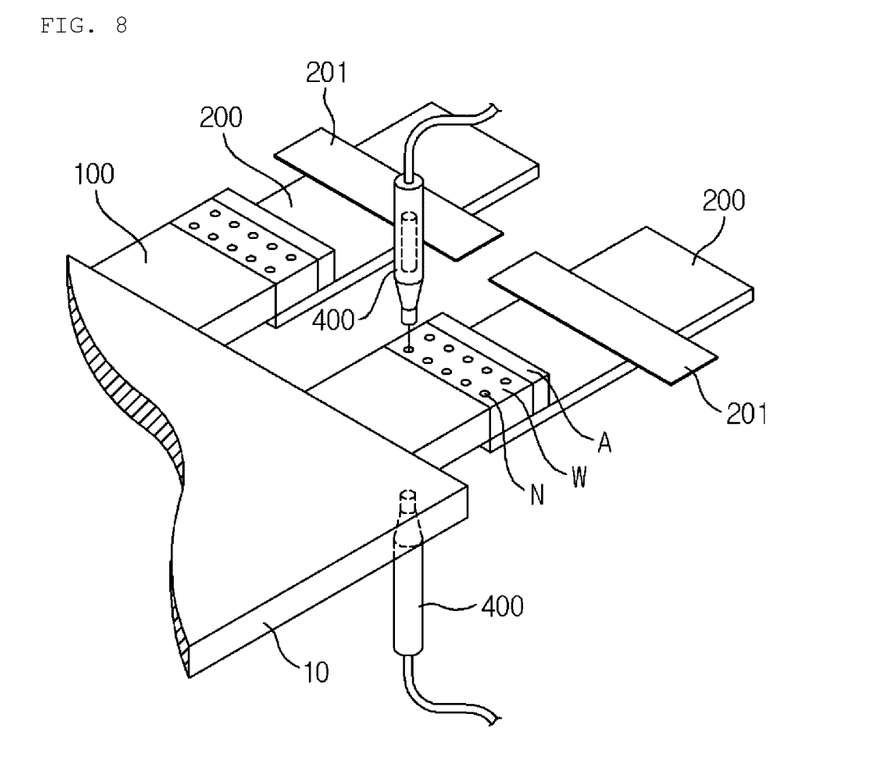
FIG. 8 is a view schematically illustrating a main welding process in accordance with one embodiment of the present invention.
Figure 9:
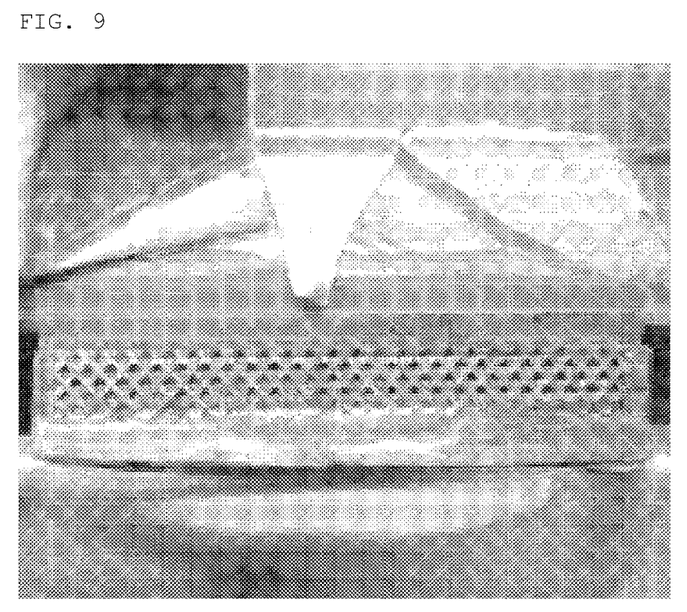
FIG. 9 is a photograph illustrating a welding resultant product in which a non-welded section is not formed between an electrode tap and a lead part.

As exemplarily shown in FIGS. 5 and 9, the lead part 200 having such a structure is stacked on the electrode tap 100 so that the ends of the lead part 200 and the electrode tap 100 may contact each other, a pair of welding rods 400 contacts the upper surface of the electrode tap 100 and the lower surface of the lead part 200, and then pressure is applied to the upper surface of the electrode tap 100 and the lower surface of the lead part 200.

Thereafter, when current is applied to the welding rods 400, the electrode tap 100 and the lead part 200 are connected by welding, and nuggets N are formed on the upper surface of the electrode tap 100 due to high temperature and high pressure of the welding rods 400.

During such a process, metal particles, such as copper, used as a base material of the electrode tap 100, are dispersed from the nuggets N, and the dispersed particles are separated from the welding part W and move to the lead film 201.

Further, metal particles remaining at the end of the electrode tap 100 in cutting of the taps (Operation S200) actively float in main welding (Operation S300).

Therefore, in the method for welding electrode taps in which an insulation defect rate of the secondary battery is reduced in accordance with the present invention, a non-welding section A is formed at a connection region between the electrode tap 100 and the lead part 200 in the main welding operation (Operation S300) and thus, movement of dispersed metal particles to the lead film 201 may be prevented.

Through experimentation, it is confirmed that the method for welding electrode taps in accordance with the present invention in which the non-welding section A is formed greatly reduces an insulation defect rate.

Figure 10:
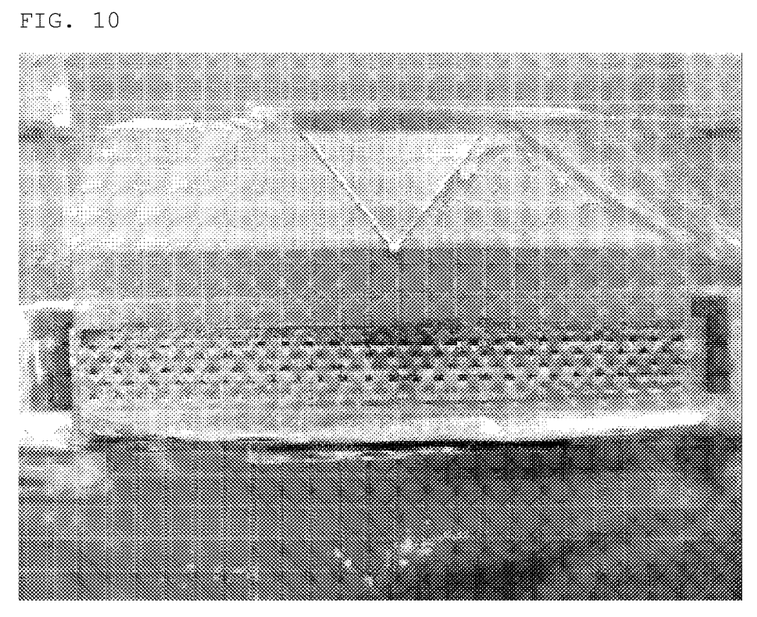
FIG. 10 is a photograph illustrating a welding resultant product in which a non-welded section is formed between an electrode tap and a lead part in accordance with one embodiment of the present invention.

That is, FIG. 9 is a photograph illustrating a case that welding is carried out up to the end of the electrode tap 100 (i.e., a non-welding section is not formed) in the main welding operation (Operation S300), and FIG. 10 is a photograph illustrating a case that welding is carried out while forming a non-welding section A at the end of the electrode tap 100.

Figure 11:
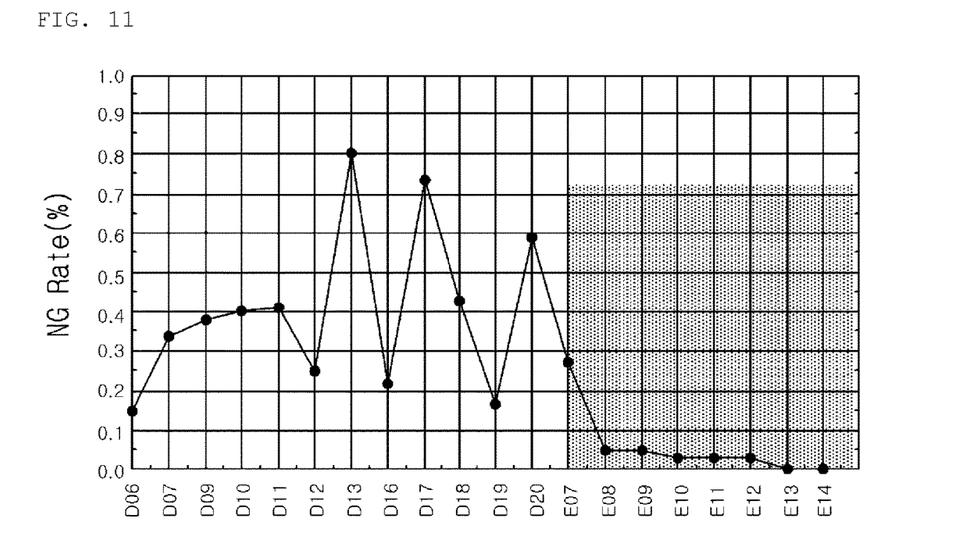
FIG. 11 is a graph illustrating insulation defect rates according to whether or not a non-welding section is formed.

FIG. 11 is a graph illustrating insulation defect rates according to whether or not a non-welding section A is formed during main welding (Operation S300). In FIG. 11, the horizontal axis means target objects (samples) of an insulation defect experiment, and the vertical axis means insulation defect rates. It may be understood that samples D06 to D20 represent cases that a non-welding section A is not formed and insulation defect rates thereof are in a comparatively wide range of 0.15 to 0.8%, and samples E07 to E15 represent cases that a non-welding section A is formed and insulation defect rates thereof are greatly reduced and have a small deviation.

It may be interpreted that, in cases that a non-welding section A is formed, insulation defect rates are regularly reduced regardless of proficiency of a worker and environments.

Figure 12:
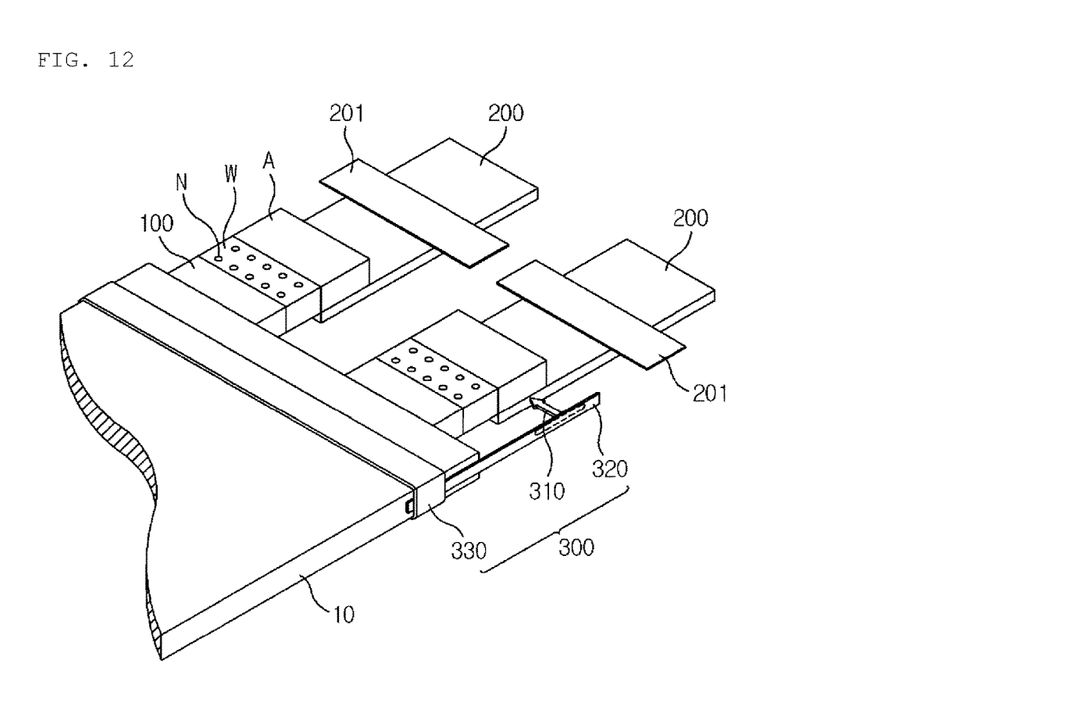
FIG. 12 is a view schematically illustrating welding using a welding guide member during the main welding process in accordance with the present invention.

Further, in order to set an accurate position of the non-welding section A, main welding (Operation S300) may be performed using a welding guide member 300 which may measure the length of the non-welding section A, as exemplarily shown in FIG. 12.

The welding guide member 300 may include a guide plate 310, a guide rail bar 320, and a connection member 330.

The guide plate 310 is formed in the shape of a rod having a designated length, has a function of guiding the position of the non-welding section A on the electrode tap 100, and moves vertically on the guide rail bar 320 having a slit. Further, the guide rail bar 320 may be connected to the battery cell 320 through the connection member 330.

Therefore, a worker locates the guide plate 310 at a position separated from the electrode tap 100 by a designated distance and then performs welding only up to this position during main welding (Operation S300), thus forming a non-welding section A having a regular length and being capable of effectively preventing dispersion of metal particles. That is, since the non-welding section A may prevent foreign substances, such as metal, from dispersing and moving to the lead film 201 but, if the non-welding section A is excessively wide, electrical connection between the electrode tap 100 and the lead part 200 may be lowered, the welding guide member 300 may both prevent foreign substances from dispersing and achieve electrical connection between the electrode tap 100 and the lead part 200.

As apparent from the above description, in a method for welding electrode taps of a secondary battery in accordance with one embodiment of the present invention, a non-welding section is formed so that a distance between a welding part, electrically connecting the electrode tap to a lead part, and a lead film may be regularly maintained and thus, dispersion and movement of metal particles generated during a welding process toward the lead film may be prevented and insulation defects may be greatly reduced.

Further, in the method for welding electrode taps in accordance with one embodiment of the present invention, main welding is performed using a welding guide member and thus, a secondary battery having uniform insulation effects may be manufactured.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for welding electrode taps comprising:
performing main welding to connect electrode taps protruded from electrode plates provided in a battery cell and lead parts electrically connecting the electrode taps to external terminals and having a lead film on surfaces thereof,
wherein, in the main welding, a welding part is formed in a first partial section of a region where the electrode taps and the lead parts overlap, and a non-welding part is formed in a second partial section of the region where the electrode taps and the lead parts overlap, wherein the second partial section is disposed between the first partial section and the lead film,
wherein the welding part and the non-welding part extend across an entire width of the electrode taps in a direction that is perpendicular to a stacking direction of the electrode taps, and
wherein the main welding is performed using a welding guide member that is detachably fixed to the battery cell and provided independent of the lead parts to indicate the position of the non-welding part.

2. The method according to claim 1, further comprising performing tack welding to perform welding for interconnection between a plurality of stacked electrode taps, prior to main welding.

3. The method according to claim 2, further comprising cutting the ends of the electrode taps on which tack welding is not performed, after tack welding.

4. The method according to claim 1, wherein the electrode plate is a cathode plate.

5. The method according to claim 1, wherein the electrode plate is an anode plate.

6. A method for welding electrode taps comprising:
performing tack welding to perform welding for interconnection between a plurality of stacked electrode taps protruded from electrode plates provided in a battery cell; and
cutting, after the tack welding, ends of the electrode taps to remove a portion of the electrode taps on which tack welding is not performed; and
performing main welding, after the cutting, to connect the electrode taps and lead parts electrically connecting the electrode taps to external terminals and having a lead film on surfaces thereof, wherein, in the main welding, a welding part is formed in a first partial section of a region where the electrode taps, and the lead parts overlap, and a non-welding part is formed in a second partial section of the region where the electrode taps and the lead parts overlap, wherein the second partial section is disposed between the first partial section and the lead film,
wherein the welding part and the non-welding part extend across an entire width of the electrode taps in a direction that is perpendicular to a stacking of the electrode taps.

7. The method of claim 1, wherein the detachable welding guide member includes a guide rail that extends parallel to the electrode tap and a guide plate that is displaceable along the guide rail.

* * * * *